United States Patent Office 2,842,455
Patented July 8, 1958

2,842,455

COMPOSITION OF PARAFFIN WAX AND A HYDROGENATED POLYMER OIL

David W. Young, Westfield, and Delmer L. Cottle, Highland Park, N. J., assignors to Esso Research and Engineering Company, a corporation of Delaware No Drawing. Original application May 27, 1954, Serial No. 432,936. Divided and this application February 1, 1955, Serial No. 485,618

2 Claims. (Cl. 106—271)

It is known to prepare oily polymers by the polymerization of a conjugated diolefin such as butadiene or the copolymerization of such a diolefin with a vinyl aromatic such as styrene. These polymeric oils have been found to be excellent drying oils and therefore useful in preparing varnishes, paints and enamels.

However, the films prepared from these oils have been found prone to check or fracture badly on exterior exposure and finally to flake away from the supporting surface. Furthermore, baked films prepared from these oils, while superior to most synthetic drying oils, still are not as satisfactory as those obtained from most natural drying oils.

According to the present invention such polymer oils are subjected to hydrogenation to improve the weather resistance and adhesion of the baked films and other properties of the oil and to obtain products suitable as plasticizers for natural and synthetic rubber, polyethylene, asphalt and wax and as addition agents for lubricating oils and the like.

The polymer oil which is to be subjected to hydrogenation, according to this invention, is prepared by polymerizing about 50 to 100 parts of butadiene-1,3 and about 50 to 0 parts of styrene at 25 to 105° C. in the presence of 1.2 to 8 parts of finely divided sodium, per 100 parts of monomers, as the catalyst and of about 50 to 500 parts of an inert hydrocarbon diluent boiling between 0 and 250° C., preferably between 20 and 200° C., in either a batch or continuous process in accordance with the disclosures of U. S. Patents 2,795,631 filed July 2, 1954; 2,712,562 filed March 5, 1954; and Example III of 2,709,662 filed July 16, 1948.

The object of this invention is a composition of paraffin wax and a hydrogenated polymer oil.

The above choice of monomers is quite specific as halogen-containing monomers such as chloroprene or chlorinated styrene are not suited for polymerization in the presence of sodium. Higher homologues of butadiene, i. e. piperylene, isoprene, and dimethylbutadiene are suitable for the purposes of the present invention. The replacement of styrene by its ring alkylated homologues, such as para-methyl styrene, meta-methyl styrene, dimethyl styrene and the corresponding ethyl substituted homologues is the only variation of monomers permissible herein; however, styrene is the most practical from the economic standpoint. Alpha methyl styrene is unsuitable because it is too unreactive toward sodium.

Materials used as diluents in the polymerization should be liquid at the polymerization temperature, that is, they should boil between 20 and 250° C., although more volatile materials boiling as low as −15° C., may also be used, providing that the polymerization pressure is increased corerspondingly. Preferred diluents are essentially aliphatic hydrocarbons such as naphtha (boiling range about 90 to 120° C.), or straight run mineral spirits such as Varsol (boiling range about 150 to 200° C.), but butane, pentane, benzene, toluene, xylene, cyclohexane, butenes, pentenes or similar inert hydrocarbons are also usable, individually or in admixture with each other. In general, the aromatic solvents are not so desirable as the aliphatic ones because of the toxicity of the former. The hydrocarbon diluents are used in amounts ranging from 50 to 300 parts by wt. per 100 parts of monomers.

An important feature of the process involves the use of a substantial amount of certain $C_4$ to $C_8$ aliphatic ethers as codiluents or modifiers along with the hydrocarbon diluent described above. A particularly outstanding promoter for the batch process has been found in dioxane-1,4 whose presence in the feed aids in the production of a colorless product of desirable viscosity and good drying properties, and promotes the reaction sufficiently to give 100% conversoin at 50° C., in a period of about 6–12 hours. Similarly favorable results were also obtained with diethyl ether $(C_2H_5)_2O$, as well as with methylal, ethylal, methyl acetal, and tertiary butyl methyl ether. In the batch process, diethyl ether is usable, although the initial induction period tends at times to be somewhat long. However, diethyl ether is the preferred ether in a continuous process as the difficulty in starting up the reaction occurs only at the beginning of the polymerization which runs for a long period of time in contrast to batching runs which have to be started up frequently. Diethyl ether is less subject to undesirable side reactions with metallic sodium, and it is a more vigorous promoter than dioxane. However, dioxane is usable also, but not preferred. Other ethers useful to a still lesser extent are diethyl acetal, vinyl isobutyl ether, dihydropyrane and ethylal, all of which have a favorable effect on improving the color of the product.

In contrast to the preferred ethers named earlier herein, the four ethers just named have a moderate retarding effect on the polymerization rate. Finally, all cyclic ethers having an O—C—O— group in a ring structure, such as dioxane-1,3, dioxolane, paraldehyde and glycol ethylidene diacetal, inhibit the polymerization rate so excessively that their use is impractical. Dimethyl ether also does not serve the desired purpose, both as regards reaction rate and product quality. Thus the cyclic ethers must have the oxygen atoms separated by at least two carbon atoms.

The ether promoter is used in amounts ranging from about 1 to 100 parts, preferably 5 to 50 parts, by wt. per 100 parts of monomers. In selecting the ether co-diluent it is especially desirable in many cases to select an ether having a boiling point of at least 10° C. below the lower limit of the boiling range of the hydrocarbon diluent, and thus, when using a mineral spirits having a boiling range of 150° C. to 200° C., ether co-diluents boiling between about 25 and 140° C., are preferred for the reason that their separation from the hydrocarbon diluent in the polymerized reaction mixture is greatly facilitated by virtue of the stated difference in boiling points. If the polymer is recovered in about 100% purity, the ether may conveniently boil in the range of the hydrocarbon diluent since both may be recycled together in making up the fresh feed to the reactor.

It is also advantageous to use about 10 to 50%, preferably 10 to 30 weight percent (based on sodium) of an alcohol in the polymerization recipe. Suitable alcohols include isopropanol, isobutanol, isopentanol, secondary butanol, and tertiary butanol. The coarser the catalyst dispersion, the more essential it is to have a sufficient amount of alcohol promoter present.

The reaction time and induction period vary depending on the degree of catalyst dispersion, reaction temperature, purity of feed materials and sequence of monomer addition.

The catalyst is usually fed to the reactor as a slurry of metal particles dispersed in 2 to 200 parts by weight of a hydrocarbon liquid, which may or may not be the same as the reaction diluent. Agitation of the reaction mixture during synthesis increases the efficiency of the catalyst.

Destruction of catalyst at the end of the reaction is effectively accomplished by adding to the reaction mixture a moderate excess of an anhydrous $C_1$ to $C_5$ fatty acid which is soluble in the hydrocarbon mixture, e. g. formic, acetic or pentanoic, or with sulfuric acid as described in copending application Serial No. 396,324, filed December 4, 1953, Patent No. 2,712,561. After destruction of the catalyst the crude polymerization product containing the salts, excess acid and other impurities is neutralized with ammonia, and the neutralized product is finally filtered preferably with a filter aid such as silica gel, clay, charcoal or its equivalent. Separation can also be accomplished by centrifuging, if desired. Other ways of destroying the catalyst may be used, such as by adding alcohol, or inorganic acids.

Since the resulting polymer solution is usually too dilute for most practical use as a varnish or enamel base, it is advantageous to distill off some of the volatile hydrocarbon solvent until a product containing not less than 40% to 70% non-volatile matter is obtained, the non-volatile matter being the polymeric drying oil. Where even more highly concentrated products are desired it is possible to raise the concentration of the polymeric drying oil to as much as 99% or greater non-volatile matter by still more extensive distillation or stripping; the use of a stripping gas, such as methane or a mixture of light hydrocarbons, is advantageous where highly concentrated drying oils are desired. Alternatively, one may use a low boiling diluent such as butane, a pentane, or a low boiling naphtha in the synthesis step and thus simplify the eventual removal of the diluent from the polymeric product.

The product of the present invention is usually a solution of polymeric drying oil in a suitable hydrocarbon solvent such as solvent naphtha or mineral spirits and is, depending on the amount and type of ether used, a clear, colorless to light yellow varnish composition, the polymer content of which has a viscosity of about 0.15 to 22 poises at 50% N. V. M. and preferably 0.15 to 3.0 poises at 50% N. V. M.

If desired, the product viscosity can be readily increased within or above the limits given above by heatbodying the polymer, preferably in 50 to 75% concentration, in the absence of air at temperatures between 200 and 300° C., e. g. at 220 to 260° C. The clear varnish composition can be brushed, poured or sprayed and gives good clear films on drying in air or baking, especially when conventional driers such as naphthenates or octoates of cobalt, lead or manganese are added thereto. Excellent films can be prepared by baking, even in the absence of driers.

Furthermore, when the drying oil compositions of the present invention are intended for use in pigmented enamels, their gloss and wetting power can be further improved by reacting them with a small amount of a polar compound such as maleic anhydride, acrylonitrile, thioglycollic acid or other equivalent materials described in copending applications Ser. Nos. 102,703, filed July 16, 1949 (now issued as Patent No. 2,652,342), and 106,487, filed July 23, 1949 (now issued as Patent No. 2,683,162).

Lead driers can be used also, but, unlike in the case of natural drying oil varnishes, are not necessary here. This, of course, is a decided advantage in some cases in view of the toxicity of the lead driers.

Another important advantage of the invention is that the present drying oils can be used as a varnish without the addition of any extraneous polymer or resin thereto. This further distinguishes the products of the invention from prior art drying oils, notably the natural oils such as linseed, which require the addition of rosin, ester gum or a phenolic resin thereto when a varnish is desired.

Now, according to the present invention, a polymer oil made as described above is subjected to hydrogenation to reduce its color and iodine number and effect other improvements. This hydrogenation may be carried out either by treating the polymer before stripping out part or all of the diluent hydrocarbons or the stripped polymer may be redissolved in a suitable inert solvent to facilitate hydrogenation in the liquid phase.

The hydrogenation may be carried out under any desired hydrogenating conditions, such as contacting the polymer solution with gaseous hydrogen under a pressure of about 100 to 5000 p. s. i. g., preferably about 500 to 3000 p. s. i. g., at a temperature range from about 200 to 500° F., preferably about 300 to 450° F., for a time ranging from a few minutes to several days, but preferably about 10 to 30 hours. In order to avoid gel formation by crosslinking, it is necessary that the hydrogenation be carried out gradually as instantaneous hydrogenation results in the production of an insoluble product. It is preferred to use a hydrogenation catalyst, which may be any of the known types such as nickel, reduced nickel, platinum, or various metal sulfides, etc., either alone or supported on a suitable carrier of great porosity or surface area, e. g. charcoal, silica gel, etc. In batch operation, the amount of catalyst should generally be about 5 to 50% by wt. based on the weight of polymer subjected to hydrogenation. In continuous hydrogenation, the feed rate of the polymer or the polymer solution through the catalyst bed should be about 0.1 to 5, preferably 0.3 to 1.0 v./v./hr.

After the hydrogenation is completed, i. e. carried out to the desired pressure drop or reduction in iodine number, and improvement in color or other characteristics, the solution may be subjected to flashing or distillation to remove the solvent and any other volatile materials, and if desired, the hydrogenated polymer may be stored, shipped, or otherwise marketed for use while still dissolved in the hydrogenation solvent. In such a case, however, it should be subjected to filtering or other purification treatment to remove the catalyst.

These hydrogenated polymers have iodine numbers between 1 and 150 and have value as varnish extenders, for cobodying with other resins and/or drying oils, for floor tile compositions, printing inks, paints, as bonding agents for plywood, as plasticizers for natural rubber and synthetic rubbers, such as butyl rubber, GR–S, GR–N, asphalt, polyethylene and wax, and as addition agents for lubricating oils and the like. The proportions may vary between 1 and 30% of the hydrogenated oil.

The hydrogenated copolymers as described above have been found to have lubricating oil and wax modifying characteristics which make them particularly desirable for blending with various lubricating oil base stocks and waxes. It has been found that either natural occurring mineral oils or synthetic lubricating oils may be improved by the addition of minor but improving proportions of the hydrogenated polymers described above.

It has also been found that the residual unsaturation present in the hydrogenated polymeric materials make it possible to further react the hydrogenated polymeric material with agents such as sulfides of phosphorus, chlorinated aliphatic compounds, acylating agents, sulfonating agents and the like. These reaction products also enchance the desirable characteristics of lubricating oils and waxes with which they are blended.

The objects, advantages, and details of the invention will be better understood from the following experimental data which are given for the sake of illustration, but without intending that the invention be limited specifically thereby.

Example I

An oily copolymer of butadiene and styrene was prepared according to the following recipe:

| | Parts by wt. |
|---|---|
| Butadiene | 80 |
| Styrene | 20 |
| Varsol | 10 |
| Naphtha | 190 |
| Dioxane | 30 |
| Sodium | 1.5 |
| Isopropanol | 0.3 |

Temperature, 40° C.

Complete conversion was obtained in 10 hours. The catalyst was destroyed and removed. The product was finished to 90% N. V. M. as described above and had a viscosity of 1.0 poise at 50% N. V. M.

Example II 83 g. of the product of Example I was placed in 220 g. heptane and 25 g. of Raney nickel catalyst was added. The mixture was placed in a 1.9 liter bomb. Hydrogen was continuously added at 25° C. until a pressure of 380–540 lbs. was obtained. The temperature was increased slowly over a period of 24 hrs. until it reached 250° C. Final hydrogen pressure was 2400 to 3000 lbs. After removal of the solvent, a colorless product having an iodine number of 18 was obtained.

Example III

The copolymer of Example I above was hydrogenated in heptane solution at 250° C. at 2400 to 3000 lbs. hydrogen pressure. The resulting material had an ASTM iodine number of 18.

This hydrogenated copolymer was blended in a paraffin wax and standard wax inspection evaluations carried out. Results are set out below.

| Percent Hydrogenated Copolymer | M. Pt., °F. | Visc. at 250° F. cs. | ASTM Penetration, 77° F. |
|---|---|---|---|
| 0 | 131.8 | 2.4 | 9 |
| 1% | 132.0 | 2.7 | 12 |
| 5% | 131.8 | 4.3 | 15 |
| 20% | 131.3 | 7.3 | 23 |

This application is a division of Serial No. 432,936, filed May 27, 1954.

The nature of the present invention having been thus fully set forth and specific examples of the same given, what is claimed as new and useful and desired to be secured by Letters Patent is:

1. A composition of matter consisting essentially of paraffin wax and 1 to 20% of a hydrogenated liquid polymer oil having an iodine number below 150 and prepared by mixing 50 to 100 parts by weight of butadiene-1,3 with 50 to 0 parts by weight of styrene, 50 to 500 parts by weight of an inert hydrocarbon diluent boiling between about 0 and 250° C., 1 to 100 parts of an ether selected from the group consisting of $C_4$-$C_8$ aliphatic ethers and cyclic ethers having the oxygen atoms separated by 2 carbon atoms, 1.2 to 8 parts of finely dispersed sodium and 10 to 50% by weight of a $C_3$-$C_5$ alcohol based on the weight of sodium, heating the mixture to a reaction temperature between 25 and 105° C. until substantially 100% conversion is obtained, destorying and removing the catalyst and subsequently contacting the resulting polymer with hydrogen under the pressure of about 100 to 5000 p. s. i. g. at a temperature between about 200 and 500° F. in the presence of a hydrogenation catalyst.

2. A composition according to claim 1 in which 80 parts by weight of butadiene-1,3, 20 parts by weight of styrene, 200 parts by weight of hydrocarbon diluent, 30 parts by weight of dioxane, 1 to 5 parts by weight of sodium and 0.3 part by weight of isopropyl alcohol are reacted at 40° C. to produce the liquid polymer oil which is submitted to hydrogenation at 25° C. under a pressure of 380 to 3000 p. s. i. g. in the presence of a nickel catalyst.

References Cited in the file of this patent

UNITED STATES PATENTS

| 2,638,460 | Crouch | May 12, 1953 |
| 2,640,809 | Nelson | June 2, 1953 |
| 2,687,963 | Marshall | Aug. 31, 1954 |
| 2,709,662 | Koenecke | May 31, 1955 |